(12) United States Patent
Runge et al.

(10) Patent No.: US 6,488,208 B1
(45) Date of Patent: Dec. 3, 2002

(54) BAR CODE READING APPARATUS

(75) Inventors: Wolfram Runge, Freiburg (DE); Sebastian Pastor, Freiburg (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 09/351,744

(22) Filed: Jul. 8, 1999

(30) Foreign Application Priority Data

Jul. 8, 1998 (DE) .......................................... 198 30 553

(51) Int. Cl.[7] .................................................. G06K 7/10
(52) U.S. Cl. .................... 235/462.01; 235/455; 359/894
(58) Field of Search ................................ 359/558, 894; 235/462.21, 455, 462.01, 46.32

(56) References Cited

U.S. PATENT DOCUMENTS

| | | |
|---|---|---|
| 3,684,866 A | 8/1972 | Jones |
| 4,018,527 A * | 4/1977 | Bartel et al. .................. 355/71 |
| 4,199,247 A * | 4/1980 | Schwarz ....................... 354/274 |
| 4,257,086 A * | 3/1981 | Gulliksen .................... 362/279 |
| 5,072,249 A * | 12/1991 | Yoshida ........................ 354/274 |
| 5,080,456 A | 1/1992 | Katz |
| 5,274,491 A | 12/1993 | Collins |
| 5,331,176 A | 7/1994 | Sant' Anselmo |
| 5,347,121 A | 9/1994 | Rudeen |
| 5,386,105 A | 1/1995 | Quinn et al. |
| 5,510,826 A | 4/1996 | Koide |

FOREIGN PATENT DOCUMENTS

| | | | |
|---|---|---|---|
| DE | 29623079 U1 | 2/1998 | |
| EP | WO 97/05423 | * 2/1997 | ............ G02B/5/00 |
| JP | 02096111 | 4/1990 | |

* cited by examiner

Primary Examiner—Michael G. Lee
Assistant Examiner—Daniel St. Cyr
(74) Attorney, Agent, or Firm—Townsend and Townsend and Crew LLP

(57) ABSTRACT

The invention relates to a bar code reading apparatus of the sensing for a bar code along a scanning direction, comprising a light source to produce a transmitted light beam and a diaphragm to restrict the cross-section of the transmitted light beam, wherein the diaphragm has a diaphragm aperture, the boundary of which has four adjoining sections, of which two sections lie opposite to one another and extend substantially transverse to the scanning direction (transverse sections), and of which two sections lie opposite to one another and extend substantially along the scanning direction (longitudinal sections). In order to compensate for diffraction effects of the transmitted light beam, the boundary of the diaphragm aperture has at least one compensatory projection at at least one transverse section, with the compensatory projection projecting as an intermediate extremity into the diaphragm aperture with respect to this cross-section in the direction towards the oppositely disposed cross-section

11 Claims, 4 Drawing Sheets

BAR CODE READING APPARATUS

BACKGROUND OF THE INVENTION

1. Field of the Invention

The present invention relates to a bar code reading apparatus for the sensing of a bar code along a scanning direction, comprising a light source to produce a transmitted light beam and a diaphragm to restrict the cross-section of the transmitted light beam, wherein the diaphragm has a diaphragm aperture, the boundary of which has four adjoining sections, of which two sections lie opposite to one another and extend substantially transverse to the scanning direction (transverse sections), and of which two sections lie opposite to one another and extend substantially along the scanning direction (longitudinal sections).

2. Description of the Prior Art

Such bar code reading apparatuses serve for the scanning of bar codes. The scanning direction corresponds to the direction of relative movement between the transmitted light beam and the bar code. A relative movement of this kind can, for example, be achieved when the bar code reading apparatus has a deflection unit, by which the transmitted light beam is periodically deflected along the scanning direction at a stationary bar code, or in which a bar code is moved along the scanning direction through a stationary transmitted light beam.

The transmitted light beam, which illuminates the bar code, appears as a light bead on the latter and must have a sufficiently small extent for the correct identification of the bars of the bar code. In many applications, the largest possible depth of focus is required for the bar code reading apparatus, i.e. the light bead should retain a sufficiently small extent along the largest possible reading range in front of and behind the bar code. For this purpose, in addition to the use of image forming optical systems, the use of diaphragms with diaphragm apertures is known, which restrict the cross-section of the transmitted light beam and permit the boundary of the aperture to be subdivided in the initially named manner with respect to the scanning direction into two oppositely disposed transverse sections and two oppositely disposed longitudinal sections.

The limitation of the extent of the light bead by such diaphragms with correspondingly small openings is, however, restricted as a result of diffraction effects; the diffraction of the transmitted light beam at the boundary of the diaphragm opening means that the intensity distribution of the light bead can differ considerably from the original uniform distribution. These diffraction effects at the bar code, however, disturb the correct identification of the bars or their width in a disadvantageous manner. As a result of these effects the diaphragm aperture and thus the cross-section of the transmitted light beam can therefore not be reduced as desired, and the depth of focus of the known bar code reading apparatuses is restricted to an undesired degree.

SUMMARY OF THE INVENTION

It is an object of the invention to provide a bar code reading apparatus of the initially named kind, which has an improved depth of focus.

This object is achieved, on the one hand, in that for the compensation of diffraction effects of the transmitted light beam the boundary of the diaphragm opening has at least one compensatory projection at at least one transverse section which projects into the diaphragm aperture as an intermediate extremity with respect to this transverse section in the direction towards the oppositely disposed transverse section.

Since the compensatory projection of the invention points in the direction towards the respective oppositely disposed transverse section of the diaphragm opening, it extends at least approximately parallel to the scanning direction.

The design of the compensatory projection as an intermediate extremity is defined in that the boundary of the diaphragm aperture at the relevant transverse section is set back on both sides of the compensatory projection relative to the latter. Mathematically considered the compensatory projection with its extent along the scanning direction thus forms a maximum with respect to the relevant transverse section. The maximum can in this sense represent a local or an absolute maximum with respect to the two ends of the relevant transverse section or with respect to possible further compensatory projections.

The boundary of the relevant diaphragm aperture can, for example, have a substantially rectangular basic shape, with either the two shorter or the two longer sides of the rectangle extending transversely to the scanning direction and thus, in accordance with the definition, forming the transverse section provided with a compensatory projection. In similar manner the boundary of the diaphragm aperture can also have an oval or round basic shape.

The compensatory projection of the invention brings about in desired manner an at least partial smudging or superimposition of those diffraction effects which are caused by the stopping down of the transmitted light beam at the boundary of the diaphragm aperture and which produce fluctuations of the intensity distribution of the resulting light bead at a bar code. A desired compensation arises in that the compensatory projection itself causes diffraction effects, which at least partly counteract the undesired diffraction effects and smudge or mutually smear the latter.

The compensatory projection thus causes an approximately continuous and uniform transition of the intensity from the center of the transmitted light beam to its edge region. In doing so, it is not essential that all diffraction effects are cancelled, but rather than the negative effects are at least substantially reduced, so that in advantageous manner a more pronounced bounding and bundling of the transmitted light beam can be achieved. In this way a greater depth of focus is achieved with the bar code reading apparatus of the invention.

The diaphragm of the invention proves to be particularly advantageous if the cross-section in accordance with the invention is intended to blank out a part of the transmitted light beam which has a relatively high or indeed similar intensity in comparison to the center of the cross-section of the transmitted light beam, which ultimately leads to pronounced diffraction effects.

This case can, for example, occur if a transmitted light beam with elliptic cross-section is to be restricted by means of a diaphragm aperture of basic rectangular shape in such a way that the transverse sections of the boundary of the diaphragm aperture blank out a significantly greater part of the elliptic cross-section of the transmitted light beam than the longitudinal sections.

The fact that the compensatory projection is provided at at least one transverse section of the diaphragm aperture, i.e. at a section which stands transversely to and thus substantially perpendicular to the scanning direction, yields the following special advantage: Through such a compensatory projection the diffraction maxima and minima of the light bead at the bar code, which are caused by the boundary of the diaphragm aperture, can in particular be reduced. These diffraction maxima and minima otherwise appear as an intensity pattern extending substantially parallel to the direction in which the bar code bars extend and thus particularly greatly impair a correct identification of the bar code. Such diffraction maxima and diffraction minima are broken through by the diffraction effects caused by the compensatory projection.

A further advantage of the diaphragm of the invention lies in the fact that it can be manufactured in simple manner. The openings of customary diaphragms are, for example, produced by laser cutting, etching, punching or drilling. In this connection the provision of one or more compensatory projections in the boundary of the diaphragm aperture represents no significant extra cost or effort or only a slight additional cost and effort.

In preferred embodiments of the compensatory projection of the invention, the latter is formed as a tooth or as a tongue, in which, for example, two straight or curved boundaries form the outline of the compensatory projection. These two boundaries can include an acute or an obtuse angle with one another. The compensatory projection can also be formed as a uniformly roundly shaped tongue, or as a rectangular tongue. Furthermore, it is possible to endow the outline of the compensatory projection with a stochastic pattern which intentionally produces chaotic diffraction patterns for the desired purpose of compensation of diffraction effects.

Finally, it is also possible to provide the compensatory projection additionally with lateral cutouts or projections in order to further enhance the desired effect of the mutual compensation of the diffraction effects that are produced.

The boundary of the diaphragm aperture can have a compensatory projection at its two transverse sections, so that the desired compensation of diffraction effects takes place both in the selected direction of scanning as well as opposite thereto. Furthermore it is preferred if the relevant transverse section or the two transverse sections have a plurality of compensatory projections. Moreover, one or more compensatory projections of the named kind can also be formed at a longitudinal section or at both longitudinal sections of the boundary of the diaphragm aperture.

Through a plurality of compensatory projections the compensation of diffraction effects can be particularly effectively produced by their mutual mixing and blurring. These several compensatory projections preferably form a stochastic arrangement, i.e. a non-periodic and in particular intentionally chaotic arrangement along the relevant transverse section. In this way the occurrence of periodic diffraction or interference patterns can be avoided. A periodic arrangement of a plurality of compensatory projections can also bring about the desired compensation of the diffraction effects.

The object of the invention is solved for a bar code reading apparatus of the initially named kind, amongst other things, also in that a filter is arranged at at least one transverse section or longitudinal section of the boundary of the diaphragm aperture for the compensation of diffraction effects of the transmitted light beam and brings about a continuous or a step-wise transition for the transmission of the transmitted light beam through the diaphragm aperture from substantially 100% at the center of the diaphragm aperture to 0% outside of the boundary of the diaphragm aperture.

Thus, this possibility of solution also aims at compensating for the diffraction effects which occur at the boundary of the diaphragm aperture by damping the light intensity.

The distribution of the degree of transmission of the filter can, for example, be a continuous distribution, in particular a linear or a Gaussian curve distribution. The degree of transmission can, however, also have a discontinuous, in particular a step-likes, distribution, for example in order to intentionally damp individual diffraction maxima, which would otherwise express themselves as an intensity maximum in a light bead at a bar code. Alternatively, the filter can also be formed as least regionally as a gray filter, so that it has a substantially constant degree of transmission in these regions. A filter of the explained kind is preferably provided at the two transverse sections of the boundary of the diaphragm aperture. It is, however, also possible for each section of the boundary to have such a filter. The filter can in particular be formed as a round filter, which is arranged along the entire boundary of the diaphragm aperture.

The invention, moreover, extends to a diaphragm with a diaphragm aperture, by which the cross-section of a light beam is to be restricted, and the boundary of which has two longitudinal sections and two transverse sections, insofar as this diaphragm has features of a diaphragm such as is described in connection with the bar code reading apparatus of the invention. A diaphragm of this kind can also be used in diverse manner in apparatuses other than the bar code reading apparatus of the invention.

DETAILED DESCRIPTION OF SPECIFIC EXEMPLARY EMBODIMENTS

Figure 1:
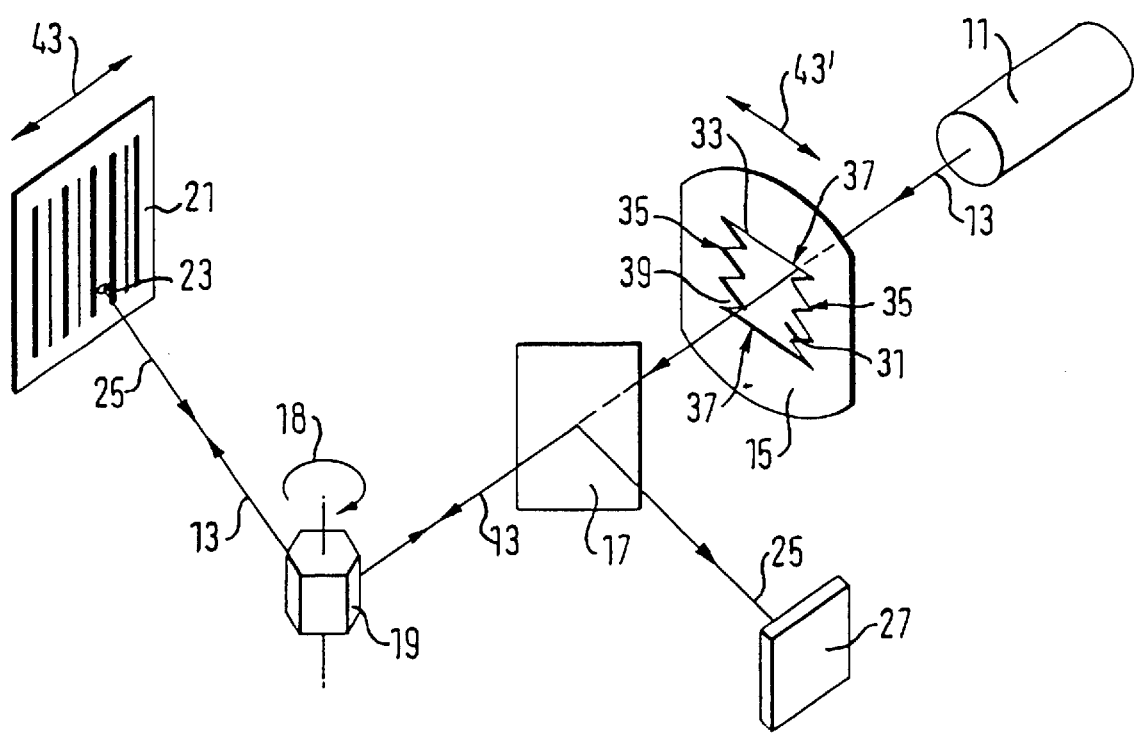
FIG. 1 is a schematic perspective view of parts of a bar code reading apparatus in accordance with the invention.

FIG. 1 shows in a schematic perspective view parts of a bar code reading apparatus in accordance with the invention. This apparatus comprises a laser light source 11, which transmits a transmitted light beam 13, with only the ray axis, which extends through the center of the transmitted light beam 13, being shown in FIG. 1. Along the transmitted light beam 13 there are arranged in series a diaphragm 15 in accordance with the invention, a beam divider formed as a partly permeable mirror 17, and a polygonal mirror 19, which operates as a deflection unit and rotates in the direction 18. The polygonal mirror 19 reflects the transmitted light beam 13 in the direction of a bar code element 21 at varying angles of deflection.

The transmitted light beam 13 appears at the bar code element 21 as a light bead 23, which wanders in the scanning direction 43. It is reflected from there, amongst other things, as a received light beam 25 in the direction of the polygonal mirror 19. This received light beam 25 is deflected by the polygonal mirror 19 in the direction of the partly permeable mirror 17 and from the latter onto a receiving element 27. The diaphragm 15 of the invention has a diaphragm aperture 31 of basic rectangular shape. The boundary 33 of the diaphragm aperture 31 has two oppositely disposed transverse sections 35, and also two oppositely disposed straight longitudinal sections 37. Each of the two transverse sections 35 has three compensatory projections 39 formed as acute-angled teeth.

Whereas the periodic deflection of the transmitted light beam 13 brought about by the rotating polygonal mirror 19 only takes place in a single direction because of the uniform rotational movement 18 of the polygonal mirror 19, the scanning direction 43 in FIG. 1 and in the further figures is shown as a double arrow, because it is immaterial in known bar code reading apparatuses in which of the two directions set by the illustrated scanning direction 43 the bar code is swept over by the transmitted light beam 13. Moreover, an oscillating mirror can also be provided in place of the polygonal mirror 19 as the deflection unit, by which the transmitted light beam 13 is deflected oscillatingly along the two directions preset by the scanning direction 43.

In the region of the diaphragm 15, the transmitted light beam 13 does not admittedly undergo any periodic deflection. However, since the transmitted light beam 13 experiences a purely geometric reflection at the polygonal mirror 19 a scanning direction 43' corresponding to the scanning direction 43 of the bar code element 21 is also uniquely defined in the region of the diaphragm 15. The positions of the two transverse sections 35 of the diaphragm aperture 31 and also the compensatory projections 39 formed thereon are dependent in accordance with the invention on the scanning direction 43'. The purpose and advantage of this dependence will subsequently be explained with reference to FIGS. 2a to 2c.

Figure 2A:
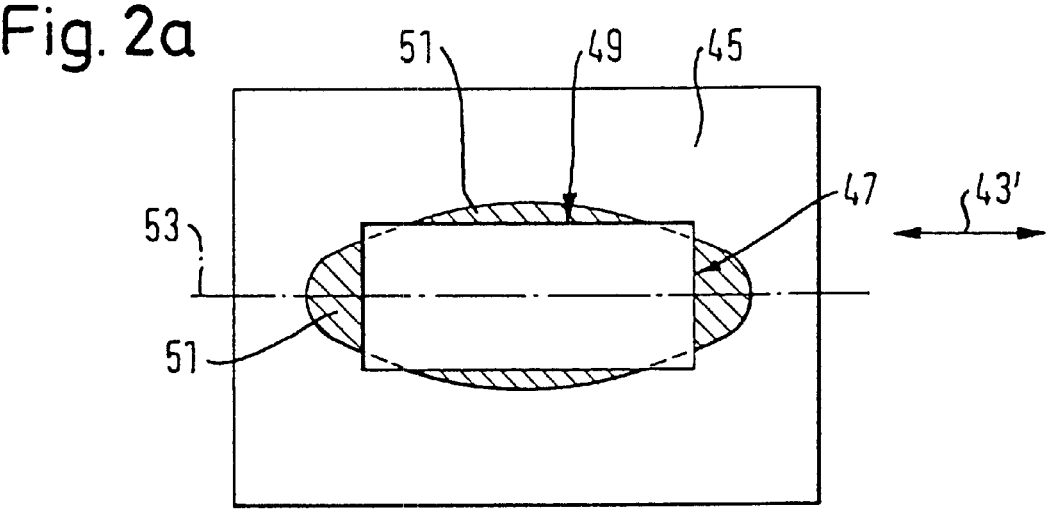
FIG. 2a illustrates the superimposition of the elliptical cross-section of a transmitted light beam on a rectangular boundary of a diaphragm aperture.

FIG. 2a shows a known diaphragm 45 with an aperture, the boundary of which has, in the sense of the initially named definition and with respect to the scanning direction 43', in each case two mutually oppositely disposed straight transverse sections 47 and two mutually oppositely disposed straight longitudinal sections 49. The diaphragm 45 is illuminated in the region of the boundary of its aperture by a transmitted light beam of elliptic cross-section in such a way that the transverse sections 47 and the longitudinal sections 49 respectively blend out a marginal region 51 of the transmitted light beam, which is shown hatched in accordance with FIG. 2a.

Figure 2B:
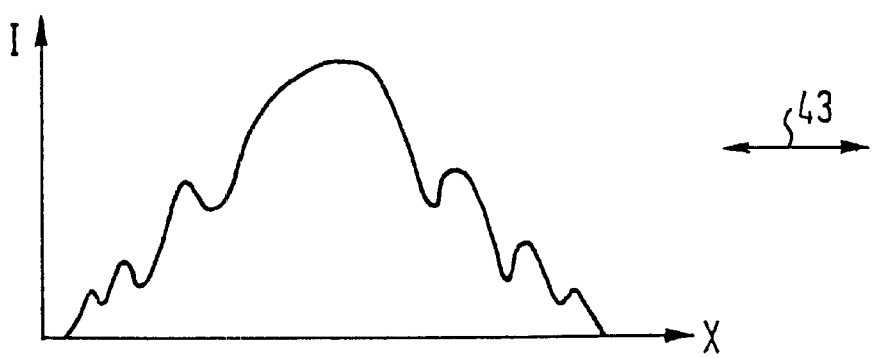
FIG. 2b illustrates the intensity distribution of a light bead along the scanning direction caused by the transmitted light beam of FIG. 2a, FIG. 2c illustrates the intensity distribution of a light bead along the scanning direction caused by the transmitted light beam of FIG. 1, FIGS. 3a–3h illustrate various diaphragms in accordance with the invention with different compensatory projections.

The transverse sections 47 and longitudinal sections 49 bring about a diffraction of the transmitted light beam passing through the aperture of the diaphragm 45, so that the intensity distribution of the remaining cross-section of the transmitted light beam has diffraction maxima and diffraction minima. FIG. 2b shows schematically the distribution of the light intensity I of the transmitted light beam after it has passed the diaphragm 45 of FIG. 2a, and indeed for an adequate distance from the diaphragm 45 and for different positions X along an axis 53, which extends within the cross-section of the transmitted light beam through its center and parallel to the scanning direction 43', 43 respectively.

If a substantially Gaussian distribution of intensity is assumed for the cross-section of the transmitted light beam prior to passing through the diaphragm 45, then the intensity distribution I of the transmitted light beam which remains after passing through the diaphragm 45 has deviations from this Gaussian shape—as shown in FIG. 2b—in such a way that clear intensity maxima and minima can be recognized at the two flanks corresponding to the respective marginal region of the remaining transmitted light beam. It is particularly these diffraction effects which are evident in FIG. 2b along the axis 53 and thus along the scanning direction 43, which can make the scanning of a bar code particularly difficult.

Figure 2C:
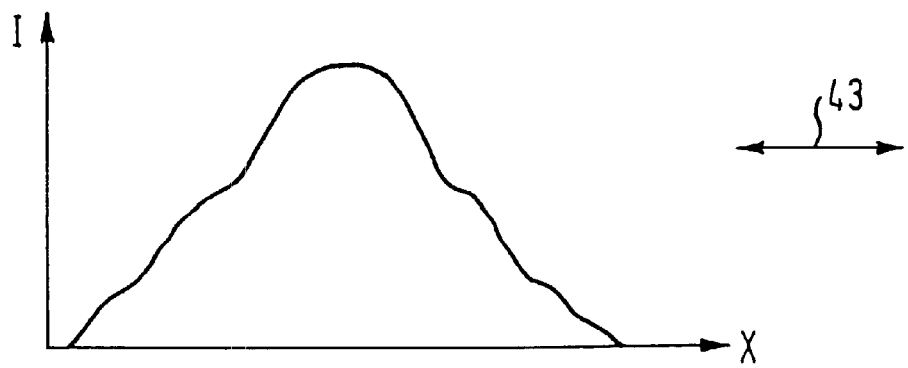

These undesired diffraction effects can be at least partly compensated if a diaphragm 15 in accordance with the invention, as explained above with reference to FIG. 1 and as will be explained below with reference to FIGS. 3a–3h, is used instead of the diaphragm 45 with a rectangular opening. If one again assumes a transverse elliptic cross-section and a Gaussian intensity distribution of the original transmitted light beam, then, after passing through a diaphragm 15 in accordance with the invention, an intensity distribution I along the scanning direction 43 results, which continues to follow an approximately Gaussian curve shape and which is shown in FIG. 2c for an adequate distance from the diaphragm 15. The diaphragm 15 of the invention is thus able to largely suppress the undesired diffraction effects. In this way this diaphragm 15 can be used to limit the transmitted light beam 13 even more from the side, which is ultimately advantageous and can make an increased depth of focus possible.

Starting from a rectangular or any other desired basic shape, a plurality of possible designs with at least one compensatory projection 39 at at least one transverse section 35 of the boundary 33 of its opening is possible for the diaphragm 15 of the invention. Examples for this are shown in FIGS. 3a to 3h.

Figure 3A:
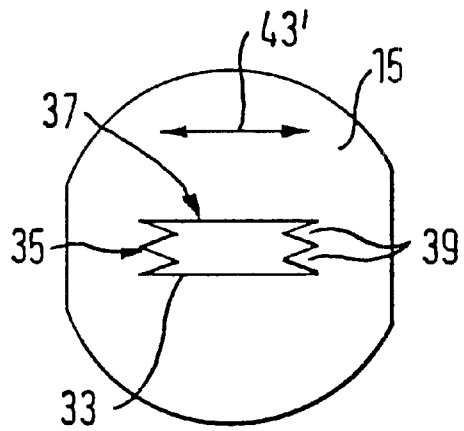
Figure 3B:
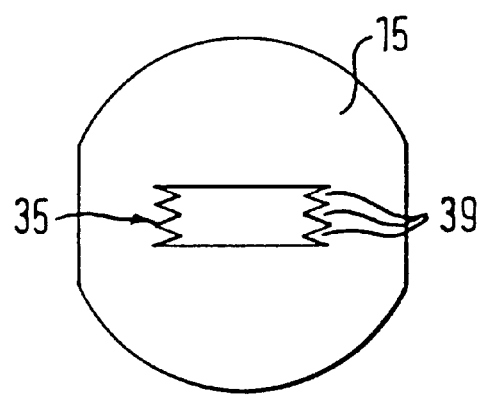
Figure 3C:
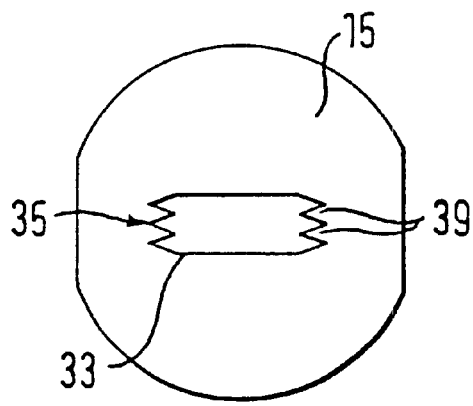
Figure 3D:
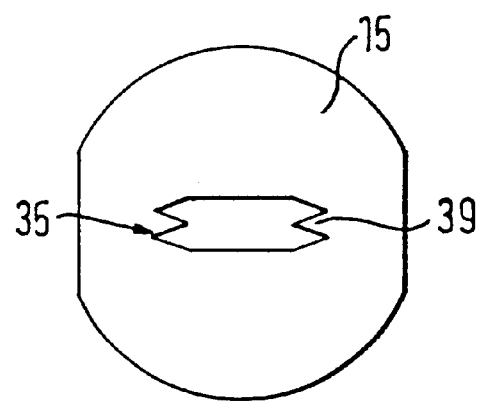
Figure 3E:
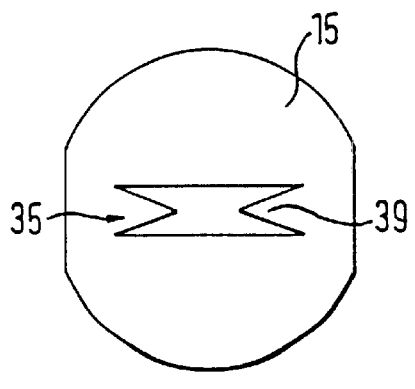
Figure 3F:
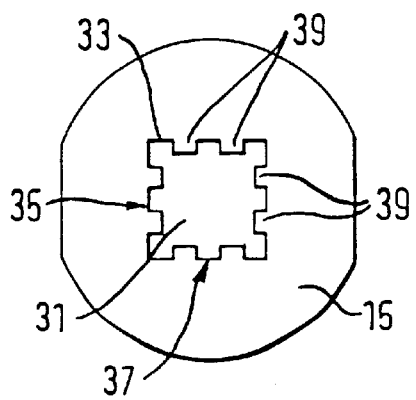
Figure 3G:
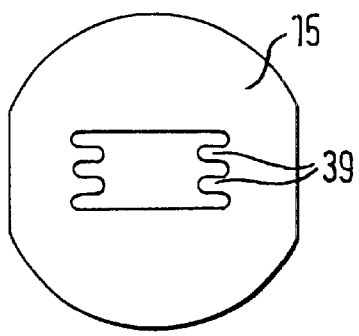
Figure 3H:
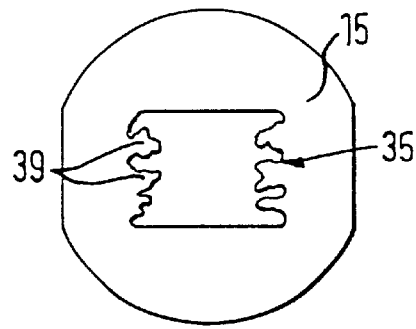

Thus, FIGS. 3a and 3c each show a diaphragm 15 in which the two transverse sections 35 of the boundary 33 have two compensatory projections 39 formed as acute-angled teeth. FIG. 3b in each case shows three compensatory projections 39 at each transverse section 35. In FIGS. 3d and 3e one compensatory projection 39 is in each case formed as an acute-angled tooth at each transverse section 35. The boundary 33 of the diaphragm 31 of FIG. 3f starts from a square basic shape, with in each case two rectangular tongues being provided as compensatory projections 39 both at the two transverse sections 35 and also at the two longitudinal sections 37. FIG. 3g shows compensatory projections 39 which are designed as rounded tongues. Transverse sections 35 are evident from FIG. 3h, which each have a plurality of compensatory projections 39 formed as a random pattern and which additionally form a random arrangement along the respective transverse section 35.

Figure 4A:
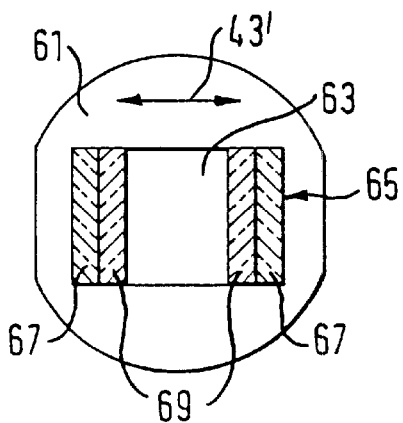
FIGS. 4a, 4b illustrate diaphragms in accordance with the invention with gray filters or graded filters.
Figure 4B:
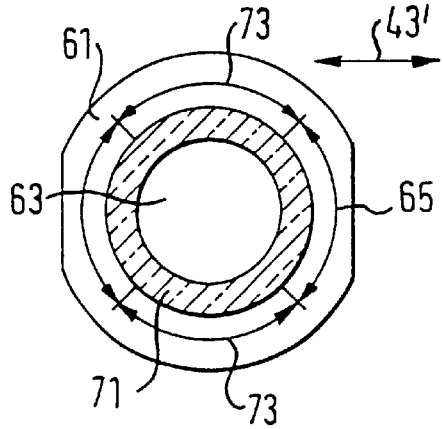

FIGS. 4a and 4b finally show diaphragms 61 with diaphragm apertures 63, the respective boundary of which is provided at least section-wise with a filter in accordance with the invention.

The diaphragm aperture 63 of the diaphragm 61 of FIG. 4a has a rectangular basic shape with a first gray filter 67 and adjoining it a second gray filter 69 being arranged in each case along the two transverse sections 65. In order to provide a discontinuous transition of the degree of transmission of the diaphragm 61 from the center of its aperture 63 in the direction of the respective cross-section 65, the first gray filter 67 has a lower degree of transmission than the second gray filter 69. In the context of the invention further filter zones of a specific degree of transmission can also be provided at the further transverse section 65 or at the longitudinal sections 73, and the graduation of the degrees of transmission of the different gray filters 67, 69 can also take place in accordance with an alternating sequence or in the reverse sequence with respect to the above-named sequence.

FIG. 4b shows a diaphragm 61 with a round diaphragm aperture 63. A ring-like graded filter 71 is arranged along the full boundary of this diaphragm aperture 63, i.e. both along the transverse sections 65 and also along the longitudinal sections 73. Starting from its side facing in the direction of the center of the diaphragm aperture 63, the graded filter 71 has an increasingly lower degree of transmission moving radially outwardly.

The filters 67, 69, 71 shown in FIGS. 4a and 4b serve for the compensation of diffraction effects which are caused by those sections 65, 73 of the boundary of the diaphragm aperture 63, at which the respective filter 67, 69, 71 is arranged. In this way comparatively small extents of diameters of the diaphragm aperture 63 are possible for the bounding of the cross-section of a light beam, without the diaphragm 61 causing diffraction effects in the light beam which would significantly impair the envisaged use of the light beam, e.g. for the scanning of a bar code.

What is claimed is:

1. A bar code reading apparatus for sensing of a bar code along a scanning direction, comprising:

a light source to produce a transmitted light beam, and a diaphragm to restrict a cross-section of the transmitted light beam, wherein the diaphragm has diaphragm aperture, a boundary of which has four adjoining sections, of which two sections lie opposite to the another and extend substantially transverse to the scanning direction, and of which two other sections lie opposite to one another and extend substantially along the scanning direction, wherein the boundary of the diaphragm aperture has at least of the diaphragm aperture has at least one compensatory projection at at least one traverse section to compensate for diffraction effects of the transmitted light beam, with the compensatory projection projecting as an intermediate extremity into the diaphragm aperture with respect to the transverse section in a direction towards an oppositely disposed relevant transverse section, wherein the compensatory projection is rigidly arranged with respect to the diaphragm.

2. A bar code reading apparatus in accordance with claim 1, wherein the compensatory projection is formed as an acute angled tooth.

3. A bar code reading apparatus in accordance with claim 1, wherein the boundary of the diaphragm aperture has a plurality of compensatory projections at the relevant transverse section.

4. A bar code reading apparatus in accordance with claim 3, wherein the plurality of compensatory projections form a random or a periodic arrangement along the relevant transverse section.

5. A bar code reading apparatus in accordance with claim 1, wherein the transverse section opposite to the relevant transverse section has one or more compensatory projections.

6. A bar code reading apparatus in accordance with claim 1, wherein at least one longitudinal section likewise has at least one compensatory projection.

7. A bar code reading apparatus in accordance with claim 1, wherein the bar code reading apparatus has a deflection unit for a periodic deflection of the transmitted light beam along the scanning direction.

8. A bar code reading apparatus in accordance with claim 1, wherein the boundary of the diaphragm aperture has a substantially rectangular, oval or round basic shape with respect to the scanning direction.

9. A bar code reading apparatus in accordance with claim 1, wherein the compensatory projection is formed as a rounded or circular arc-like tongue.

10. A bar code reading apparatus in accordance with claim 1, wherein the compensatory projection is formed as a rectangular tongue.

11. A bar code reading apparatus in accordance with claim 1, wherein the compensatory projection is formed as a random pattern.

* * * * *